United States Patent [19]

Hosmer et al.

[11] 4,258,103

[45] Mar. 24, 1981

[54] DECORATIVE LAMINATE COMPRISING AN INHERENTLY GLUABLE BACKING SHEET AND PROCESSES FOR MAKING SAME

[75] Inventors: William A. Hosmer, Cape Elizabeth; William M. Bowler, Portland, both of Me.

[73] Assignee: Scott Paper Company, Philadelphia, Pa.

[21] Appl. No.: 600,225

[22] Filed: Jul. 30, 1975

[51] Int. Cl.$^3$ ............................................. B32B 27/20
[52] U.S. Cl. .................................. 428/342; 428/436; 428/478.8; 428/518; 428/526; 428/530
[58] Field of Search ............... 428/436, 538, 443, 526, 428/327, 325, 478, 518, 342, 488, 921, 172, 165; 260/17.4 ST, 39 R, 6; 156/308, 328, 335, 222; 525/58

[56] References Cited

U.S. PATENT DOCUMENTS

| Re. 27,644 | 5/1973 | Kelly et al. | 428/327 |
|---|---|---|---|
| 3,017,373 | 1/1962 | Carlson | 428/478 X |
| 3,421,967 | 1/1969 | Hochner | 428/526 X |
| 3,558,418 | 1/1971 | Porter et al. | 428/327 |
| 3,583,932 | 6/1971 | Benton et al. | 428/538 X |
| 4,030,955 | 6/1977 | Antono et al. | 156/235 |

Primary Examiner—Stanley S. Silverman
Attorney, Agent, or Firm—R. Duke Vickrey; John W. Kane, Jr.

[57] ABSTRACT

Decorative, heat-and-pressure consolidated laminates comprising a decorative sheet impregnated with a thermosetting resin which does not undergo color deterioration during the consolidation step and a backing sheet, the outer surface of which has been coated prior to consolidation with a composition containing an inert filler, a non-thermoplastic adhesive, and a water-soluble thermosetting resin selected from the class consisting of urea-formaldehyde resin condensates and melamine-formaldehyde resin condensates; and processes for making such laminates.

34 Claims, No Drawings

DECORATIVE LAMINATE COMPRISING AN INHERENTLY GLUABLE BACKING SHEET AND PROCESSES FOR MAKING SAME

BACKGROUND OF THE INVENTION

1. Field of the Invention

The present invention relates to decorative laminates, to backing sheets which are useful in preparing such laminates, and to processes for making such backing sheets and such laminates.

2. Description of the Prior Art

Decorative laminates have been produced commercially in the United States and elsewhere for a number of years, and have found widespread acceptance as mar-resistant surfaces for wall-coverings, paneling, table tops, counter tops, vanities, and the like. These laminates are conventionally formed by consolidating several laminae under heat and pressure to form a unitary structure which usually carries on at least one of its surfaces a surface decoration which can range from something as simple as a solid color to something as complex as an embossed, simulated woodgrain finish.

Although the methods of preparing such laminates and the number and types of laminae can vary widely, the procedure generally involves the use of one or more sheets of corestock, depending primarily on the ultimate thickness desired, in combination with a decorative or print sheet and, if desired, a top sheet or overlay. The corestock, if corestock is employed, usually comprises an unbleached kraft paper which has been impregnated with a relatively inexpensive thermosetting resin such as phenolic resin, a polyester resin, and the like, which is easily cross-linked upon the application of the consolidation pressure and heat.

The decorative or print sheet usually has more stringent requirements than the corestock, in that it is usually pigmented, yet still must be capable of also being impregnated with a "noble" thermosetting resin (i.e. a resin which is also cross-linkable upon the application of the consolidation pressure and heat, but which exhibits little or no color deterioration upon the application of such pressure and heat and which prevents any strikethrough or "bleeding" of the thermosetting resin used in the corestock. Two of the most common "noble" thermosetting resins used to impregnate the decorative or print sheet employed in the preparation of such laminates are urea-formaldehyde resin condensates and melamine-formaldehyde resin condensates, although other resins such as polyester resins have also been employed as "noble" resins for the impregnation of such sheets). In many instances the decorative or print sheet must also be capable of being printed with a design such as a geometric pattern, simulated wood grain, etc., which survives the consolidation step virtually intact.

In a number of instances, and particularly when the decorative sheet carries a printed design, an overlay sheet is also incorporated as one of the laminae of the decorative composite. The overlay is generally a thin, high-quality, alpha-cellulose paper which is also impregnated with a "noble" thermosetting resin which is usually the same as that used to impregnate the decorative or print sheet being employed. The overlay sheet is usually designed so that it transparentizes completely during the consolidation of the laminae, thereby enabling the decoration and/or printing present on the decorative sheet to be easily seen in the finished laminate; yet it also imparts a greater degree of mar and abrasion resistance to the decorative laminate than would otherwise be obtained without such an overlay.

As indicated above, the various laminae employed to form the ultimate laminate are consolidated through the simultaneous application of pressure and heat. This is generally achieved by subjecting a sandwich of the various laminae to heated pressure platens until the desired consolidation has been accomplished. As would be expected, and in order to achieve manufacturing efficiencies, commercial laminating operations usually involve the pressing of more than a single laminate at one time, through the use of presses having multiple openings therein.

Although the configuration of such presses can vary widely, they generally comprise two heavy, heated platens on the top and bottom of the press, with additional heated platens in between, the number of which being dictated by the number of openings desired in the press in question. Each opening in any given press typically comprises the following elements in the following order: (a) a heated platen, (b) one or more sheets of caul stock, which are primarily intended to distribute pressure uniformly over the surface of the caul plate, (c) a metal caul plate, (d) the opening itself, (e) another metal caul plate, (f) one or more sheets of caul stock, and (g) another heated platen.

When more than one laminate is to be pressed in a given opening (i.e., a "book" or "pack" of laminates), the pair of laminae being pressed in such an opening are usually pressed in a back-to-back configuration. However, since the impregnated corestock material which is usually employed in preparing such laminates tends to adhere to the caul plate when only one laminate per opening is being consolidated in the press, or to another laminate composite in the stack when more than one laminate per opening is being consolidated in the press, it is also customary to employ a release sheet or liner between the corestock and the caul plate when only one laminate per opening is being pressed, or between laminates in a stack when a stack of more than one laminate is being pressed in an opening. Such liners or release sheets can be designed to release freely from the laminate or laminates after consolidation has occurred, but in most instances the release sheet or liner is designed so that it becomes an integral part of the consolidated laminate during the consolidation step. In those instances where a stack of laminates are being consolidated in a single opening of a press, at least one side of the release sheet or liner often carries a release coating, so that if it is intended that the sheet or liner become an integral part of one of the laminates in the stack being consolidated, this laminate with the release sheet or liner attached thereto can readily be separated after consolidation from the next adjacent laminate in the stack. These release sheets or liners are also often referred to as separator sheets, and are, for example, made of materials such as thin, high-density glassine.

After consolidation, and particularly in those applications where the resulting laminate is intended to be used in a structural application, rather than merely for its decorative effect, the laminate is ofttimes subsequently bonded to a substrate material such as plywood, hardboard, particle board, cement-asbestos board, and the like, to give it additional strength and rigidity for its intended structural use. Unfortunately, however, and particularly in those instances where conventional adhesives such as thermosetting adhesives, hot-melt adhesives, latex emulsions, animal glues, and the like, are employed, the bonding process usually requires, as the initial step, the sanding of the back surface of the laminate to ensure an adequate bond between the laminate and the substrate material to which it is being bonded. Not only does this sanding step, merely because it is an additional step, add to the manufacturing costs of laminated products produced in such a manner, but this step can also be responsible for increased waste of laminated material prior to its being glued to the appropriate substrate material. Since the laminates in question are relatively inflexible after the resins contained therein have been thermoset during the consolidation process, thin laminates (e.g., laminates comprising merely an overlay sheet, a decorative sheet, and single sheet of corestock or a single backing sheet) are particularly susceptible to damage during the sanding step due to their brittleness after consolidation. Thus, in addition to the increase in costs which are attributable directly to the sanding step added to the process, there is often an additional increase in costs which is attributable to an increase in the damage and waste. Although there are coating compositions in the prior art (c.f., for example, U.S. Re. Pat. No. 27,644) which are designed to provide a backing sheet which, after consolidation in a laminate, does not require sanding of the resulting laminate in order to achieve a consolidation laminate which is readily gluable to a reinforcing substrate, such laminates cannot easily be consolidated in contact with one another in a stack without adhering to one another during the consolidation process.

SUMMARY OF THE INVENTION

The present invention relates to a backing sheet for use in the manufacture of heat-and-pressure consolidated laminates which has been coated with a coating composition containing an inert filler material, a non-thermoplastic adhesive and a water-soluble thermosetting resin selected from the class consisting of urea-formaldehyde resin condensates and melamine-formaldehyde resin condensates. When such a backing sheet is consolidated under heat and pressure with at least a decorative sheet impregnated with a thermosetting resin which does not undergo color deterioration during the consolidation step, the resulting consolidated laminate is readily gluable to reinforcing substrates with conventional adhesives and without the need of first sanding the coated surface of the backing sheet in order to achieve an acceptable bond. In addition, the use of such backing sheets enables one to simultaneously consolidate two laminates in back-to-back contact with one another without the use of a release liner separator sheet to yield consolidated laminates which are easily separable from one another after consolidation and which are readily gluable without further treatment.

DESCRIPTION OF THE PREFERRED EMBODIMENTS

As indicated above, the present invention relates to a gluable backing sheet which is useful in the preparation of decorative laminates and which carries on one of its surfaces (the one which ultimately becomes the outer surface of the consolidated laminate) a coating comprising an inert filler material, a non-thermoplastic adhesive composition and a water-soluble, thermosetting resin selected from the class consisting of urea-formaldehyde resin condensates and melamine-formaldehyde resin condensates.

The backing sheet which is employed can be any fibrous material which does not appreciably flow upon application of heat during the consolidation step (e.g., cellulose, glass, asbestos, and the like) and which is sufficiently porous to allow the sheet to be satisfactorily coated with the required composition and to still absorb resin through its uncoated side from either the corestock or decorative sheet during consolidation. In most instances a cellulosic backing sheet having a basis weight of from about 20 to about 120 pounds per 3300 square feet of material is employed, with cellulosic backing sheets having a basis weight of from about 45 pounds to about 75 pounds per 3300 square feet of material being preferred. As can be seen, both the composition of the backing sheet and its basis weight can vary widely, and the ultimate choice depends on a number of factors such as the final thickness desired in the laminate comprising the backing sheet, the amount of flow of resin expected from the corestock or the decorative sheet which is employed, etc. Lighter weight backing sheets may be used where there is less resin flow anticipated from the corestock or decorative sheet in contact with the backing sheet during the consolidation step, however, extremely light backing sheets may prove to be more difficult to handle during the laminating operation. Conversely where a greater amount of resin flow is anticipated from the corestock or the decorative sheet in contact with the backing sheet during the consolidation step, heavier backing sheets should be employed.

When the backing sheet is a cellulosic material, the composition can vary widely, from 100% hardwood fibers to 100% softwood fibers. However, since most applications will require a fairly uniform sheet having sufficient internal bond strength and the requisite absorbency, a backing sheet comprising about 50% of hardwood fibers is generally preferred. Such sheets may also contain clay or other conventional filler materials, and they may also include internal bonding agents or surface sizes which are employed to enhance the uniformity of coating hold-up of any coatings subsequently applied (e.g., a starch solution is often applied at the size press on the paper machine to aid in any subsequent coating operations). Internal bonding agents are often employed to insure that the backing sheet has sufficient strength to resist delamination within the sheet after the resulting laminate has been glued to a reinforcing substrate, yet is sufficiently undensified and therefore porous at the time of lamination to enable the resin from either the corestock or decorative sheet in contact therewith to easily flow into said backing sheet during the consolidation step. Backing sheets having Gurley densitometer values of from about 75 to about 150 and internal bond strengths (as measured by the Scott Internal Bond Tester) of from about 150 to about 350 are preferred.

As hereinbefore indicated, the coating composition applied to the backing sheet on the surface which ultimately becomes one of the outermost surfaces of the laminate prior to its being glued to a reinforcing material comprises three essential components: (1) an inert filler, (2) a non-thermoplastic adhesive, and (3) a water-soluble, thermosetting resin selected from the class consisting of urea-formaldehyde resin condensates and melamine-formaldehyde resin condensates. Although the amounts of these essential components are not narrowly critical, and may vary considerably depending which particular materials are employed in a given instance, the amounts for each of the various essential components generally range from about 70 parts by weight to about 85 parts by weight of filler per 100 parts by weight of dry coating, from about 12 parts by weight to about 20 parts by weight of non-thermoplastic adhesive per 100 part by weight of dry coating, and from about 3 parts by weight to about 10 parts by weight of water-soluble, thermosetting resin per 100 parts by weight of dry coating, with from about 71 parts by weight to about 80 parts by weight of filler, from about 15 parts by weight to about 20 parts by weight of adhesive, and from about 5 parts by weight to about 9 parts by weight of water-soluble, thermosetting resin being preferred.

Illustrative of the types of filler materials which can be employed in the coating compositions of this invention are fillers such as clays, calcium carbonates, talcs, titanium dioxide, aluminum silicates, and the like. Without wishing to be bound to any particular theory as to the function of the filler in such coating compositions, it is believed that the filler acts as a stabilizer in these coating compositions, and that it also controls to a large degree the blocking characteristics (i.e., the tendency or lack thereof of the finished coating to adhere to itself or other materials) of the resulting coating during the laminating step and in the subsequent gluing operation.

Illustrative of the types of non-thermoplastic adhesives which can be employed in the adhesive coating compositions of this invention are adhesives such as solublized proteinaceous materials (e.g., a soya protein such as Ralston Purina's "Procote" which has been solublized with ammonia), casein, cationic starches, polyvinyl alcohols and the like. With some adhesives (e.g., with a polyvinyl alcohol) it has been found that it is often desirable to also incorporate with the adhesive small amounts of a hardening agent for the adhesive (e.g., small amounts of compounds such as melamine, urea, glyoxal, etc.). As in the case with the filler material, it is not completely certain as to the total function or functions of the non-thermoplastic adhesive, yet it is believed that the adhesive, in addition to providing a surface on the backing sheet which does not flow appreciably during the lamination step and is therefore easily bonded after lamination to reinforcing substrates using conventional glues (as opposed to special, contact adhesives), also acts as a barrier to prevent strike-through of any resin flowing from either the corestock or decorative sheet in contact with the backing sheet during the lamination step.

As indicated above, the third essential component in the coating compositions employed in the preparation of the backing sheets of this invention is a water-soluble, thermosetting resin selected from the class consisting of urea-formaldehyde resin condensates and melamine-formaldehyde resin condensates. Illustrative of such materials are resin condensates such as "Sunrez 666" from Sun Chemical Corporation, "Aurarez 138-P" from Auralux Chemical Associates, "Parez 613" from American Cyanamid Corporation, and the like. Again, without wishing to be bound to any particular theory as to the function of the water-soluble, thermosetting resin in the coating compositions employed in the preparation of the backing sheets of this invention, it is believed that the resin contributes to the non-blocking characteristics of the resultant coating and also enhances the gluability of the resulting laminate.

In addition to the essential components of the coating compositions set forth above, the coating compositions used in the preparation of the backing sheets of this invention can also include minor amounts of other, non-essential components such as pigments or dyes for color, flame retardants (e.g., antimony oxide, aluminum trihydrate, etc.), defoamers, fungicides, and the like without departing from the scope of this invention in any way.

The coating compositions used to prepare the backing sheets of this invention can be applied to the backing sheet using any of the conventional coating techniques which are generally available for the coating of paper with aqueous coating compositions, and the finished coating weights which are generally employed in preparing backing sheets in accordance with the present invention are not narrowly critical, with finished coating weights of from about five pounds per 3300 square feet of backing sheet to about fifteen pounds per 3300 square feet of backing sheet being preferred. At coating weights of less than about 5 pounds per 3300 square feet the ability of the coating to act as a barrier to the flow of resin from either the corestock or the decorative sheet in contact with the backing sheet during the laminating step starts to become marginal, and coating weights of greater than 15 pounds per 3300 square feet are not known to serve any additional useful purpose.

As indicated above, one of the major applications of the coated backing sheets of the present invention is in the preparation of decorative laminates which are formed in a high-pressure, multiple-opening press. In a commercial pressing operation such presses consist of two exterior, heavy, heated, press platens, with from 2 to 18 or more openings in between. In a typical laminating operation a single laminate will be pressed in each of the openings immediately adjacent the exterior heavy, heated, press platens, with two laminates being pressed, back-to-back, in each of the other openings in the laminating press. Where a pair of laminates are being pressed in a single opening, the decorative face of each of the pair is against either a caul plate or a release material between the caul plate and the decorative face, with the back sides of the pair being separated by a release liner or a separator sheet. The release liner, which is generally a high-density, thin sheet of paper having a release coating on at least one side thereof, is obviously intended to enable easy separation of the pair of laminates after lamination is completed. In most instances it adheres to the back of one of the laminates, becoming an integral part thereof, while releasing from the laminate in contact with the side having a release coating thereon. Thus, upon removal from the laminating press and separation of the pairs, each of the laminates is then sanded to rough up the back and/or destroy the integrity of the separator sheet, in order to provide a back surface on each of the laminates which is receptive to being glued using conventional adhesives.

In contrast to the typical lamination procedure which is described immediately above, one of the objectives of the present invention is to provide a backing sheet or sheets which can be employed in place of the separator sheet previously employed to maintain a separation between a pair of laminates being pressed back-to-back, which become an integral part of the laminates being pressed, which enable easy separation of the pair of laminates upon completion of the laminating step, and which provide a laminate which is readily gluable to a reinforcing substrate with conventional adhesives without having to be sanded beforehand.

The following examples are intended to further illustrate the invention disclosed and claimed herein, but they are not intended to limit the scope thereof in any way. All parts and percentages are parts and percentages by weight and not by volume, unless specifically stated otherwise in the particular example. The cellulosic bodystock or backing sheet employed in these examples is, unless otherwise indicated, prepared from a fibrous furnish containing approximately 50% hardwood fiber, 50% miscellaneous broke. The furnish also contained 8 parts by weight per 100 parts by weight of fiber of a calcium carbonate filler and 4.5 parts by weight per 100 parts by weight of fiber of titanium dioxide pigment. A base sheet was formed from this furnish using conventional papermaking techniques, and after the paper was formed, it was passed through a size press to coat both sides thereof with a size coating derived from an aqueous sizing solution containing 100 part of a coating clay, 87 parts of an ethylated corn starch, 0.2 parts of a fungicide ("Dowicide G", manufactured by the Dow Chemical Co. of Midland, Mich.), 1 part of a dimethylol urea hardener, 1 part of a defoamer and 0.13 part of a phosphate dispersant (phosphotex), said components being dispersed in sufficient water to yield a solution containing 22% non-volatile solids. Pick-up at the size press was in the range of from 3 to 6 pounds (dry weight) per 3300 square feet of base sheet to yield a bodystock or base sheet having the following specifications:

| | |
|---|---|
| Basis weight | 63 pounds per 3300 square feet |
| Elmendorf Tear | 55–65 grams |
| Internal Bond Strength | 150–300 thousandths of a foot pound per square inch |
| Wax Pick | 12 (Dennison Wax Number) |
| Gurley Densitometer | 75–150 second per 100 cubit centimeters of air. |

EXAMPLE 1

Using an off-machine, air-knife coater, a coating dispersion containing 100 parts clay ("Alphacote"), 25 parts of a protein-aceous adhesive (Ralston Purina "Procote"), 3 parts of ammonia, 189 parts of water, and 12.5 parts of a melamine-formaldehyde resin solution containing 80% non-volatile solids ("Parez" 613) was applied to one side of the base sheet described above at a rate sufficient to yield a coating of 10 pounds (dry weight) per 3300 square feet of base sheet, or a finished weight for the resulting backing sheet of 73 pounds per 3300 square feet. This backing sheet was then used to prepare laminates, each of which consisted of one decorative sheet which had previously been saturated with a melamine-formaldehyde laminating resin, four sheets of corestock, each of which had previously been saturated with a phenolic resin, and a backing sheet of the type described immediately above, with its coated surface away from the sheet of corestock in contact therewith. Two such laminates were pressed simultaneously in back-to-back contact with one another, with each of the decorative sheets in contact with a caul plate. Between each of the caul plates and the press platens there was inserted a sheet of unimpregnated caul stock, which was merely intended to even pressure distribution over the surfaces of the laminates being pressed. The laminates were pressed for 20 minutes at 280° F. and at a pressure of 1000 pounds per square inch, and then the press was cooled for about five minutes in order to allow the caul plates to approach room temperature. Upon removal of the laminates from the press, they could easily be separated from one another without disturbing the back surface of either, and the resulting thicknesses of each of the laminates were from 46 to 48 mils.

Each of the resulting laminates were then subsequently glued to a reinforcing particle board to which there had previously been applied a conventional polyvinyl acetate glue (National Starch's Polyvinyl Acetate Glue No. 40-0516) at a rate of from about 10 to about 20 pounds glue per 1000 square feet of particle board. The amount of glue applied was intended to be sufficient to thoroughly and uniformly coat the entire surface of the particle board to which the laminates were being glued, yet minimize the "squeeze out" of the glue during the gluing step. Each of the laminates were pressed onto the particle board with the backing side down, and then placed in a press at 75 pounds per square inch pressure and at room temperature for approximately one hour. Upon removal from the press, the glued samples were then allowed to further set for an additional 24 hours, at which time the faces of each of the samples were scarified with a saw the full length of the face at one-inch intervals and down through the thickness of the laminate and into the particle board for testing purposes.

The testing of the samples involves pulling a strip of the laminate from the surface of the particle board and then observing the amount of wood particles which separate from the particle board and adhere to the back of the glued laminate (the greater the number of particles, the better the bond). After testing the initial bond 48 hours after gluing, the scarified samples containing the remaining strips are then subjected to a two-step cycle of 24 hours at 156° F., followed by 24 hours at 0° F. This cycle is repeated for a total of four times, with strips being removed after each step in the cycle. Forty-eight hours after gluing and before being cycled, 45% of the back of a strip of the laminate contained wood particles; and, after four complete cycles, 95% of the back of a strip of the laminate was covered with wood particles, indicating the initial glue bond which was obtained and which was excellent, improved substantially after being cycled four complete times.

Substituting a conventional urea formaldehyde glue for the polyvinyl acetate glue used above, all other conditions and procedures being the same, resulted in a reinforced laminate which exhibited an initial bonding strength which, upon stripping, caused 50% of the back of the stripped laminate to be covered with wood particles or fibers. This increased after four cycles to a point where 65% of the back of the stripped laminate was covered with wood fibers or particles. Substituting a common contact cement yielded a reinforced laminate which exhibited an initial wood fiber pull of 80%, which increased to 85% after four cycles.

EXAMPLE 2

Applying the same coating dispersion to the same base sheet employed in the immediately preceding Example 1, except that only five pounds (dry weight) of coating dispersion were applied per 3,300 square feet of base sheet, resulted in a backing sheet, which when pressed in contact with a melamine-formaldehyde saturated decorative sheet for 275° F. for 15 minutes at 1,000 pounds per square inch yielded laminates approximately 12 mils thick. Upon removal from the laminating press after it has cooled to room temperature, those laminates which were pressed in back-to-back configuration in a single opening were easily separated from one another.

Samples of the laminates obtained were then glued and cycled in the same manner as that set forth above with respect to the laminates obtained in the preceding example, Example 1. Those glued to the reinforcing particle board using polyvinyl acetate glue gave an initial bond which, when tested in the manner set forth above in Example 1, yielded a strip of laminate having 48% of its back surface covered with wood particles, and a bond after four complete cycles which yielded a strip of laminate having 85% of its back surface covered with wood particles. With contact cement as the adhesive, the initial bond yielded a strip of laminate having 70% of its bonded surface covered with wood particles, and the bond after four complete cycles improved to a point where 90% of the back of the strip was covered with wood particles.

EXAMPLE 3

Employing the same base sheet as that employed in the preceding Examples and modifying the coating formulation employed in these Examples by substituting an equal amount of lactic casein for the proteinaceous adhesive, one side of the base sheet was coated with the coating dispersion so modified to yield a coated backing sheet having a coating thereon in the amount of 10 pounds per 3,300 square feet. Thin laminates employing this backing sheet and a single sheet of a melamine-formaldehyde saturated decorative sheet were made using the same pressing or consolidation conditions as those employed in preparing the laminates made in accordance with the procedures set forth in Example 2. Those laminates which were pressed in back-to-back configuration in a single opening of the press separated easily upon removal therefrom, and the gluability characteristics of the resulting laminates were essentially equivalent to those of the laminated prepared using the backing sheet having the coating thereon which was derived from the formulation containing the proteinaceous adhesive.

EXAMPLE 4

Employing the same base sheet as that employed in the preceding Examples and modifying the coating formulation employed in Examples 1 and 2 by substituting 25 parts of a polyvinyl alcohol ("Vinol" 125 from Air Products Corporation) and 1 part of a 40% solution of glyoxal for the proteinaceous adhesive, one side of the base sheet was coated with the coating dispersion so modified to yield a coated backing sheet having a coating thereon in the amount of 10 pounds per 3,300 square feet. Thin laminates employing this backing sheet and a single sheet of a melamine-formaldehyde saturated decorative sheet were made using the same pressing or consolidation conditions as those employed in preparing the laminates made in accordance with the procedures set forth in Example 2. Those laminates which were pressed in back-to-back configuration in a single opening of the press separated easily upon removal therefrom, and the gluability characteristics of the resulting laminates were essentially equivalent to those of the laminates prepared using the backing sheet having the coating thereon which was derived from the formulation containing the proteinaceous adhesive.

EXAMPLE 5

Using the same base sheet as that employed in the preceding Examples, a coating dispersion containing 100 parts clay ("Alphacote"), 25 parts of a cationic starch ("Catokote 1380" from National Starch), 2.75 parts of a 40% solution of glyoxal and 6.5 parts of a melamine-formaldehyde resin solution containing 80% non-volatile solids ("Parez 613" from American Cyanamid) was coated on one side thereof to yield a backing sheet having a dry coating, of 10 pounds per 3,300 square feet. Thin laminates employing this backing sheet and a single sheet of a melamine-formaldehyde saturated decorative sheet were made using the same pressing or consolidation conditions as those employed in preparing the laminates made in accordance with the procedures set forth in Example 2. Those laminates which were pressed in back-to-back configuration in a single opening of the press separated easily upon removal therefrom, and the gluability characteristics of the resulting laminates were essentially equivalent to those of the laminates prepared using the backing sheet having the coating thereon which was derived from the formulation containing the proteinaceous adhesive.

What is claimed is:

1. A decorative, heat-and-pressure consolidated laminate which comprises at least a decorative sheet impregnated with a thermosetting resin which does not undergo any significant color deterioration during consolidation and a backing sheet, the outer surface of which has been coated prior to consolidation with a coating composition which comprises an inert filler, a non-thermoplastic adhesive, and a water-soluble, thermosetting resin selected from the class consisting of urea-formaldehyde resin condensates and melamine-formaldehyde resin condensates.

2. A decorative, heat-and-pressure consolidated laminate which comprises at least a decorative sheet impregnated with a thermosetting resin which does not undergo any significant color deterioration during consolidation and a backing sheet, the outer surface of which has been coated prior to consolidation with coating derived from the composition as claimed in claim 1 which also comprises at least one sheets of impregnated corestock between the decorative sheet and the backing sheet.

3. A reinforced, decorative laminate which comprises a laminate as claimed in claim 2 glued to a reinforcing substrate.

4. A decorative-heat-and-pressure consolidated laminate as claimed in claim 1 wherein the filler is selected from the class consisting of clay, calcium carbonate, talc, titanium dioxide and aluminum silicate.

5. A reinforced, decorative laminate which comprises a laminate as claimed in claim 4 glued to a reinforcing substrate.

6. A decorative-heat-and-pressure consolidated laminate as claimed in claim 1 wherein the non-thermoplastic adhesive is selected from the class consisting of solublized proteinaceous materials, casein, cationic starch and polyvinyl alcohol.

7. A reinforced, decorative laminate which comprises a laminate as claimed in claim 6 glued to a reinforcing substrate.

8. A decorative, heat-and-pressure consolidated laminate as claimed in claim 1 wherein the coating composition comprises from about 70 parts by weight to about 85 parts by weight of inert filler per 100 parts by weight of the dried coating composition, from about 12 parts by weight to about 20 parts by weight of non-thermoplastic adhesive per 100 parts by weight of the dried coating composition, and from about 3 parts by weight to about 10 parts by weight of water-soluble, thermosetting resin per 100 parts by weight of the dried coating composition.

9. A reinforced, decorative laminate which comprises a laminate as claimed in claim 8 glued to a reinforcing substrate.

10. A decorative, heat-and-pressure consolidated laminate as claimed in claim 8 wherein the coating composition comprises from about 71 parts by weight to about 80 parts by weight of inert filler per 100 parts by weight of the dried coating composition, from about 15 parts by weight to about 20 parts by weight of non-thermoplastic adhesive per 100 parts by weight of the dried coating composition, and from about 5 parts by weight to about 9 parts by weight of water-soluble, thermosetting resin per 100 parts by weight of the dried coating composition.

11. A reinforced, decorative laminate which comprises a laminate as claimed in claim 10 glued to a reinforcing substrate.

12. A decorative, heat-and-pressure consolidated laminate as claimed in claim 1 wherein the coating composition also comprises, as an additional component, a hardening agent.

13. A reinforced, decorative laminate which comprises a laminate as claimed in claim 12 glued to a reinforcing substrate.

14. A decorative, heat-and-pressure consolidated laminate as claimed in claim 12 wherein the hardening agent is selected from the class consisting of melamine, urea, and glyoxal.

15. A reinforced, decorative laminate which comprises a laminate as claimed in claim 14 glued to a reinforcing substrate.

16. A decorative, heat-and-pressure consolidated laminate as claimed in claim 15 wherein the coating composition comprises a clay filler, a polyvinyl alcohol adhesive, a glyoxal hardener, and a melamine-formaldehyde resin.

17. A reinforced, decorative laminate which comprises a laminate as claimed in claim 16 glued to a reinforcing substrate.

18. A decorative, heat-and-pressure consolidated laminate as claimed in claim 14 wherein the coating composition comprises a clay filler, a cationic starch adhesive, a glyoxal hardener, and a melamine-formaldehyde resin.

19. A reinforced, decorative laminate which comprises a laminate as claimed in claim 18 glued to a reinforcing substrate.

20. A decorative, heat-and-pressure consolidated laminate as claimed in claim 1 wherein the coating composition comprises a clay filler, a proteinaceous adhesive, and a melamine-formaldehyde resin.

21. A reinforced, decorative laminate which comprises a laminate as claimed in claim 20 glued to a reinforcing substrate.

22. A decorative, heat-and-pressure consolidated laminate as claimed in claim 1 wherein the coating composition comprises a clay filler, a lactic casein and, a melamine-formaldehyde resin.

23. A reinforced, decorative laminate which comprises a laminate as claimed in claim 22 glued to a reinforcing substrate.

24. A reinforced, decorative laminate which comprises a laminate as claimed in claim 1 glued to a reinforcing substrate.

25. A decorative, heat-and-pressure consolidated laminate which comprises a gluable backing sheet of cellulosic fibers having a basis weight of from about 20 pounds to about 120 pounds per 3300 square feet of sheet material and having on one surface thereof a dried coating which comprises an inert filler, a non-thermoplastic adhesive, and a water-soluble thermosetting resin selected from a class consisting of urea-formaldehyde resin condensates and melamine-formaldehyde resin condensates.

26. A reinforced, decorative laminate which comprises a laminate as claimed in claim 25 glued to a reinforcing substrate.

27. A decorative, heat-and-pressure consolidated laminate as claimed in claim 25 wherein the backing sheet has a basis weight of from about 45 pounds to about 75 pounds per 3300 square feet of sheet material.

28. A reinforced, decorative laminate which comprises a laminate as claimed in claim 27 glued to a reinforcing substrate.

29. A decorative, heat-and-pressure consolidated laminate as claimed in claim 27 wherein the backing sheet has Gurley densitometer value of from about 75 to about 150.

30. A reinforced, decorative laminate which comprises a laminate as claimed in claim 29 glued to a reinforcing substrate.

31. A decorative-heat-and-pressure consolidated laminate as claimed in claim 29 wherein the backing sheet has an internal bond strength of from about 150 to about 350 thousandths of a foot-pound per square inch.

32. A reinforced, decorative laminate which comprises a laminate as claimed in claim 31 glued to a reinforcing substrate.

33. A decorative-heat-and-pressure consolidated laminate as claimed in claim 25 wherein the finished coating weight ranges from about 5 pounds per 3300 square feet of base material to about 15 pounds per 3300 square feet of base material.

34. A reinforced, decorative laminate which comprises a laminate as claimed in claim 1 glued to a reinforcing substrate.

* * * * *